United States Patent [19]
Sakuma et al.

[11] Patent Number: 4,638,145
[45] Date of Patent: Jan. 20, 1987

[54] LASER MACHINING APPARATUS

[75] Inventors: Hisayuki Sakuma; Susumu Hoshinouchi, both of Hyogo, Japan

[73] Assignee: Mitsubishi Denki Kabushiki Kaisha, Tokyo, Japan

[21] Appl. No.: 799,686

[22] Filed: Nov. 19, 1985

[30] Foreign Application Priority Data

Nov. 20, 1984 [JP] Japan .................................. 59-244852

[51] Int. Cl.⁴ .............................................. B23K 26/02
[52] U.S. Cl. ........................ 219/121 LU; 219/121 LB; 219/121 LZ; 219/121 LA
[58] Field of Search .................. 219/121 LA, 121 LB, 219/121 L, 121 LZ, 121 EA, 121 EM, 121 LM, 384, 121 LU, 121 LV; 364/167, 474

[56] References Cited

U.S. PATENT DOCUMENTS

| 3,974,016 | 8/1976 | Bondybey et al. | 219/121 LA |
| 4,095,084 | 6/1978 | Shutt | 219/121 LA |
| 4,297,559 | 10/1981 | Whitman, III | 219/121 EB |
| 4,555,610 | 11/1985 | Polad et al. | 219/121 EB |

FOREIGN PATENT DOCUMENTS 0098620  6/1982  Japan .......................... 219/121 LB Primary Examiner—M. H. Paschall
Attorney, Agent, or Firm—Sughrue, Mion, Zinn, Macpeak & Seas

[57] ABSTRACT

A laser machining apparatus capable of performing high-quality and precise cuts on sharply angled or complexly configured portions of a plate-type workpiece with minimum burn-through loss of material due to thermal saturation. In accordance with the invention, values are prestored representing optimum laser output with respect to the speed of the laser beam relative to the workpiece for various types of workpiece material and thickness of the workpiece. These values are read out and the laser beam controlled in accordance therewith during cutting operations. Some of the values represent a continuous output and are applied for higher speed cutting, while others represent a pulsed output and are applied for lower speed cutting.

8 Claims, 7 Drawing Figures

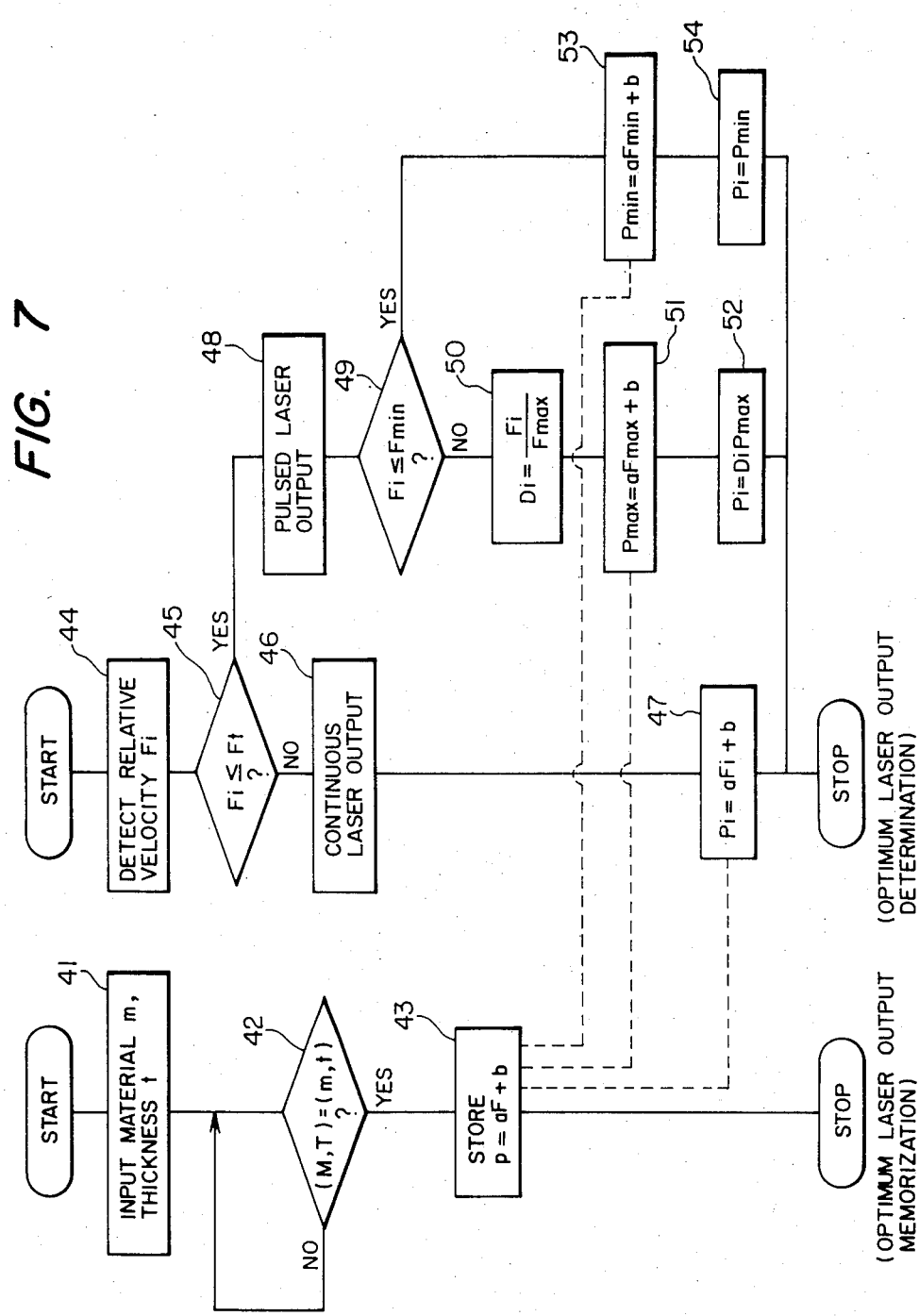

LASER MACHINING APPARATUS

BACKGROUND OF THE INVENTION

The present invention relates to a laser machining apparatus and, particularly, to such an apparatus which can perform high-quality, high precision cutting of objects such as sharply angled portions of a plate-type workpiece in a complex configuration with minimum burn-through loss of material due to thermal saturation.

FIG. 1 shows schematically in cross section a conventional laser machining apparatus of this type. In FIG. 1, a laser beam 3 generated by a laser oscillator 2 and delivering a laser beam transmission tube 4 is deflected by a fully reflecting mirror 5 such that the beam is directed to a workpiece 1 at a right angle. Then, the beam 3 is condensed by a condenser lens 7; the condensed beam irradiates the workpiece 1 through a machining head 6.

An assist gas introduced through a gas port 8 into the machining head 6 is jetted from a nozzle 9 to the workpiece 1 to assist the laser machining thereof. The workpiece 1 is supported by a machining table 10 which is movable two-dimensionally by X and Y drive motors 11a and 11b. With this arrangement, laser cutting along a complex path is possible.

In the conventional laser machining apparatus, since the magnitude and waveform of the laser output are fixed, fine portions of the workpiece which are laser-cut tend to be subjected to varying thermal influences, resulting in nonuniformity of quality and low precision of the cutting operation.

FIG. 2 illustrates an example of a workpiece cut using the conventional laser machining apparatus. In FIG. 2, around sharp edge portions a, b and c where the direction of cutting is changed, the real velocity, i.e., the relative velocity (m/min), of the laser beam 3 irradiating the workpiece 1 with respect to the latter, is unavoidably lower than along straight edge portions, as shown in FIG. 3. Therefore, because machining is performed with a constant laser output, such sharply edged portions as the portions a, b and c or finely configurated portions such as portions i and j tend to be overheated, and thus portions 15 (hatched regions) of the workpiece material are removed (melting loss) due to thermal saturation of these portions.

To avoid this problem, the operator of the laser machining apparatus has had to determine optimum cutting conditions for every cut performed on the material, taking into account the thickness and cutting path of the workpiece, which is troublesome and requires time-consuming work and with the degree of success depending largely on the operator's skill.

SUMMARY OF THE INVENTION

The present invention was made to eliminate the problems inherent in the conventional laser machining apparatus described above, and hence an object of the invention is to provide a laser machining apparatus which can provide automatically stabilized machining of sharply edged portions of a plate-type workpiece in a complex configuration with high quality, high precision, reduced machining time, and minimum burn-through loss due to thermal saturation of these portions.

The above and other objects are achieved, according to the present invention, by providing a laser machining apparatus including a laser oscillator, velocity detection means for detecting the velocity of a laser beam directed on a workpiece relative to the latter, optimum laser output memory means for storing optimum laser output values corresponding to respective values of the relative velocity and determined in accordance with the material and thickness of the workpiece, optimum laser output determination means for determining an optimum laser output in response to a detection signal from the velocity detection means and in accordance with the respective optimum laser output values from the optimum laser output memory means, and laser output control means responsive to an output of the optimum laser output determination means for controlling an output of the laser oscillator.

The values stored in the optimum laser output memory means are used to determine optimum laser output conditions with respect to the relative velocity automatically in response to signals indicative of the material and thickness of the workpiece, and the optimum laser output determination means determines the optimum laser output in response to the velocity of the laser beam relative to the workpiece. The laser output controlling means controls the output power of the laser oscillator automatically in response to the output of the optimum laser output determination means. Therefore, it is possible to perform laser machining of plate workpiece along a complex contour with minimum burn-through loss due to thermal saturation and with the machining operation being performed in a shortened time period.

BRIEF DESCRIPTION OF THE DRAWINGS

FIG. 7 is a flowchart for explaining the operation of an optimum laser output determination device shown in FIG. 5.

DESCRIPTION OF THE PREFERRED EMBODIMENTS

Figure 1:
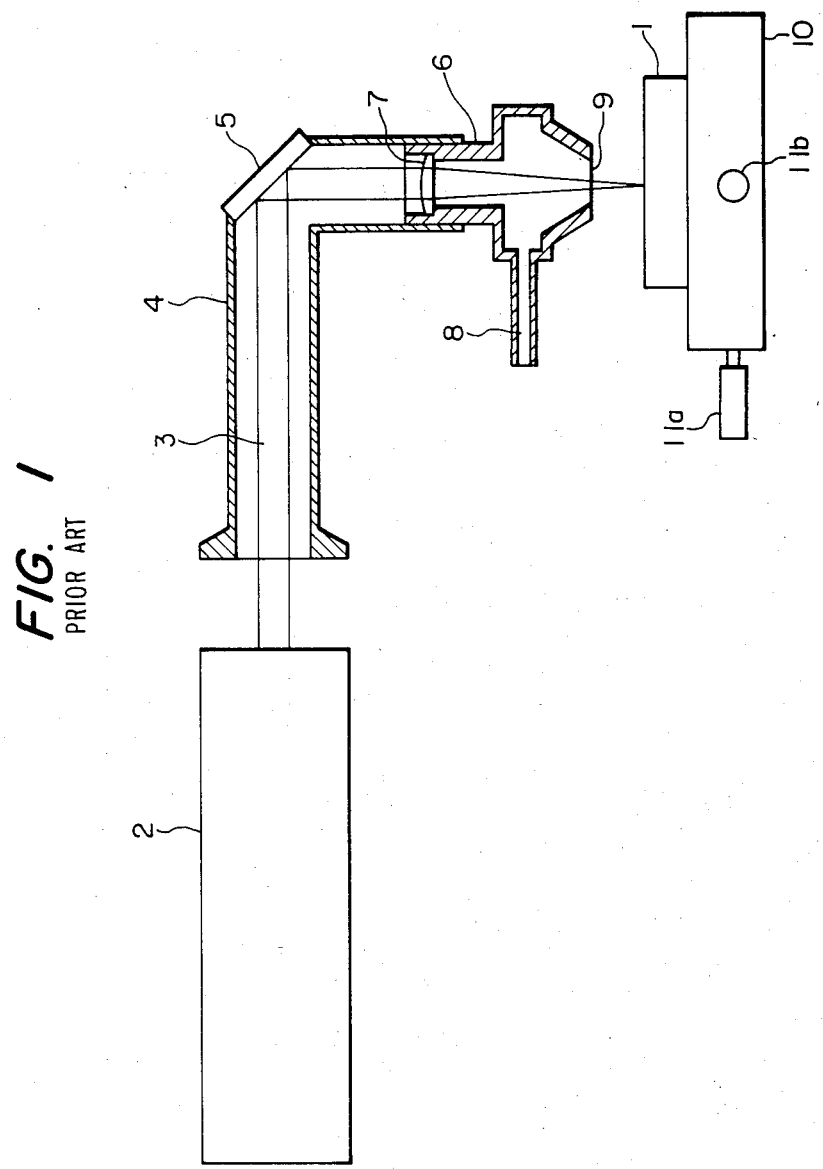
FIG. 1 shows a cross section of a conventional laser machining apparatus.
Figure 2:
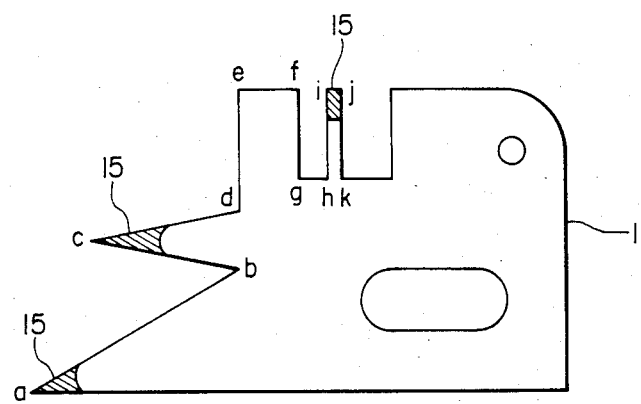
FIG. 2 a plan view of an example of a workpiece machined with the conventional laser machining apparatus.
Figure 3:
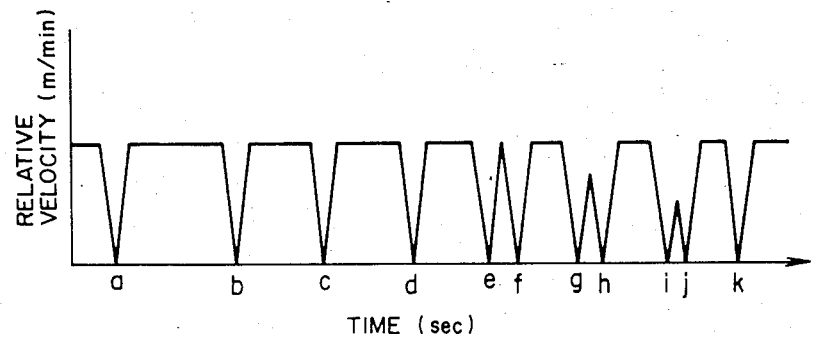
FIG. 3 is a graph showing relative velocity with respect to time for the machining operation depicted in FIG. 2.
Figure 4:
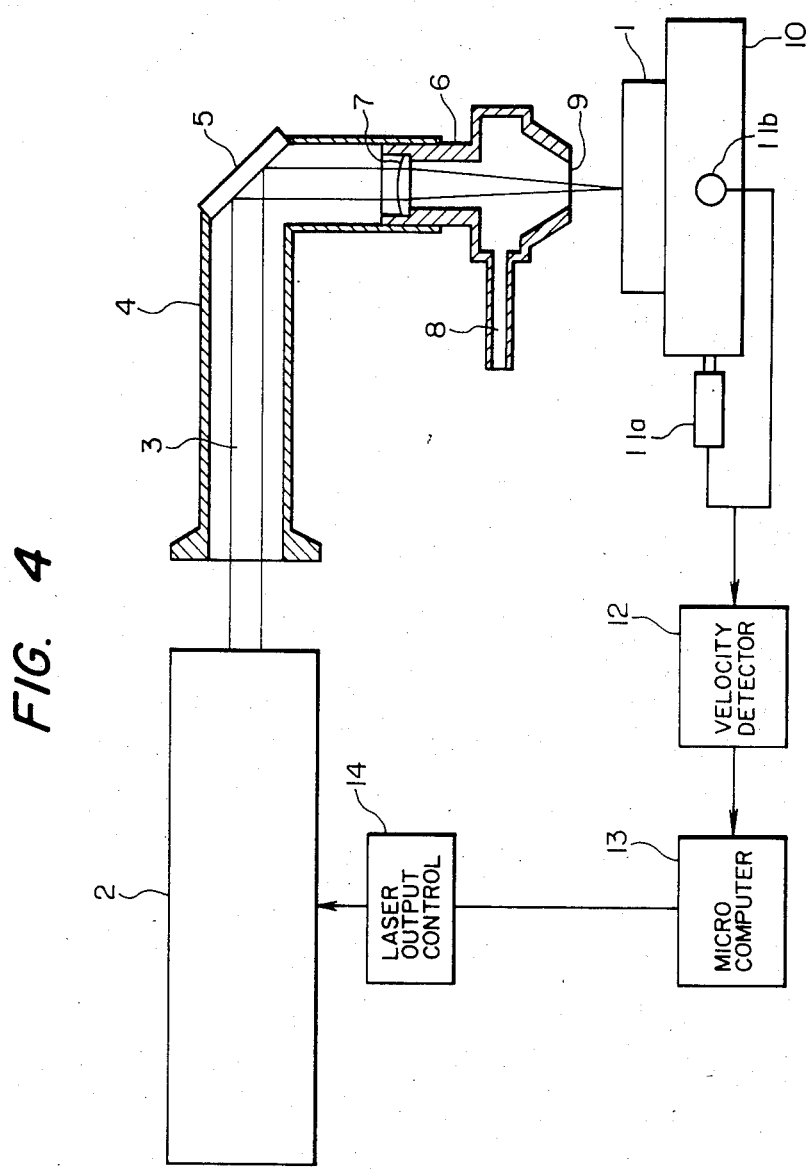
FIG. 4 is a cross-sectional view of a preferred embodiment of a laser machining apparatus constructed according to the present invention.

FIG. 4 shows a preferred embodiment of the present invention.

In FIG. 4, a laser machining apparatus according to the present invention includes a velocity detector 12 for detecting the velocity of a laser beam 3 relative to a workpiece 1, and an eight-bit microcomputer 13, which functions as an optimum laser output memory device for storing optimum laser outputs with respect to the relative velocity determined according to the material and thickness of the workpiece 1, as well as an optimum laser output determination device responsive to a detection signal from the velocity detector 12 for determining the optimum laser output power. A laser output control device 14, responsive to the output of the microcomputer 13, controls the output power of a laser oscillator 2.

Figure 5:
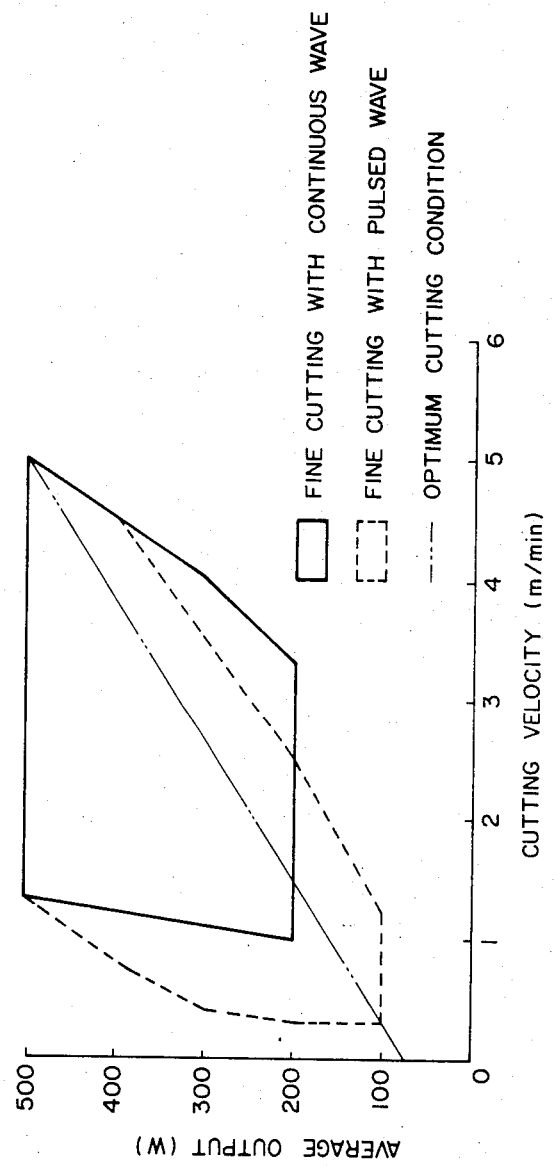
FIG. 5 is a graph showing the optimum laser output with respect to the relative velocity for the case of the embodiment shown in FIG. 4.
Figure 6:
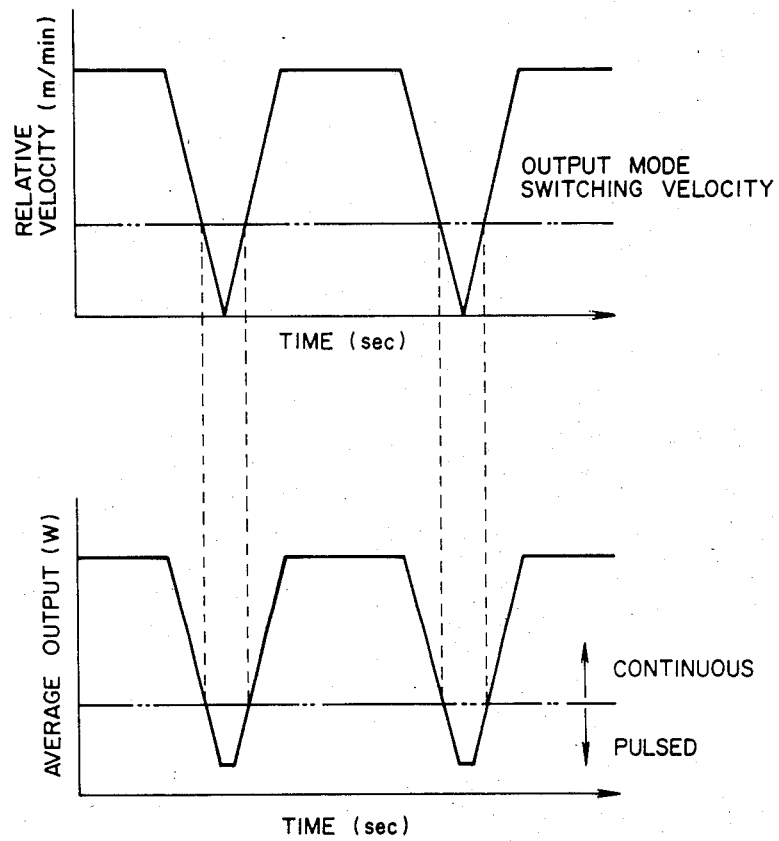
FIG. 6 shows the relationship of the relative velocity to the average laser output.

FIG. 5 is a graph showing optimum laser output-relative velocity characteristics for a soft steel plate workpiece 1 mm thick, which characteristics are stored in the microcomputer 13 and which are derived empirically from fine cutting of workpieces. It should be noted that the microcomputer 13 stores optimum laser outputs with respect to various relative velocities for various materials and thicknesses of the workpiece.

The operation of this apparatus will be described with reference to FIGS. 4 to 7.

With specific reference now to FIG. 7, which is a flowchart of operations of the microcomputer 13, in steps 42 and 43, when values indicating the material m and the thickness t of the workpiece 1 are inputted to the microcomputer 13, the latter determines automatically an optimum laser output using the relation $p=aF+b$, where a and b are constants dependent on the values m and t, respectively, for a relative velocity F required for this input data. Then, the workpiece 1 is irradiated with the laser beam 3 while an assist gas is supplied, whereupon cutting is performed as in the conventional manner. Then, velocities $V_x$ and $V_y$ of the machining table 10 in X and Y directions are obtained by the velocity detector 12 in response to rotational speeds of an X-axis drive motor 11a and a Y-axis drive motor 11b which move the machining table 10 upon which is placed the workpiece 1. In this embodiment, the microcomputer 13 provides a relative velocity $F_i$ by evaluation of:

$$F_i = \sqrt{V_x^2 + V_y^2},$$

in the step 44.

The microcomputer 13 determines an optimum laser output $P_i$ in response to the relative velocity $F_i$ on the basis of the value of $P=aF+b$ obtained in the step 43.

The laser output control device 14 is responsive to $P_i$ received from the microcomputer 13 to control the power source of the laser oscillator 2 to thereby control the laser output power.

As will be described in more detail below, the microcomputer 13 controlling the conditions of laser output is responsive to the relative velocity $F_i$ of the workpiece 1 in such a way that, in addition to determining the value of laser output power, the laser output is made continuous during high-speed cutting and is pulsed with a predetermined pulse waveform during low-speed cutting. That is, as indicated in FIG. 7, once the relative velocity $F_i$ is determined, the microcomputer 13 compares an output mode switching point $F_t$ stored therein and which has been determined according to the material m and thickness t of the workpiece, which values were previously obtained from the characteristic curve of FIG. 5 employing the relative velocity $F_i$ in the step 45. If the relative velocity $F_i$ is higher than the mode switching point $F_t$, the laser output is made continuous in the step 46 and 47, with the output value being given by the equation $P_i=aF_i+b$, and, if the relative velocity $F_i$ is smaller than $F_t$, the operation of the microcomputer is shifted to the step 48, according to which the laser output is made pulsed. Then, in the step 49, the relative velocity $F_i$ is compared with a lower control limit $F_{min}$ of velocity. If the relative speed $F_i$ is larger than $F_{min}$, an operation of calculating $D_i=F_i/F_{max}$, where $F_{max}$ is the minimum velocity, is performed in the steps 50 to 52, and an optimum laser output $P_i$ is obtained according to $P_i=D_iP_{max}$. On the other hand, when the relative velocity $F_i$ is smaller than $F_{min}$, the optimum laser output $P_i$ is determined as $P_i=P_{min}$ in the steps 53 and 54.

In a case where for example, the material and thickness of the workpiece 1 are soft steel and 1 mm, respectively, ordinary straight cutting is performed using typically a continuous laser output of 500 W and a cutting velocity of 5 m/min. For the cutting of an edge portion where the cutting direction is changed, the laser output is controlled according to the present invention such that the laser produces a continuous output when the cutting is 1.5 m/min or higher and produces a pulsed output when it is less than 1.5 m/min.

As shown in FIG. 5, a straight line, indicated by a chain line, which shows the optimum laser output and which is stored in the microcomputer, is derived from conditions for cutting a region of complex configuration in which there is no dropping of melting material formed at a lower edge of the workpiece along a cutting line. That is, since the roughness of the cut surface, which is one of the important factors determining the quality of cutting, is considerable for low-speed cutting with a continuous laser output and for high-speed cutting with a pulsed laser output, and is reduced for high-speed cutting with a continuous output and low-speed cutting with a pulsed output, it is important for attaining an improved laser cutting quality to switch the laser output between the continuous mode and the pulsed mode according to the actual cutting speed. With such control of the laser power and output waveform, it is possible to cut the workpiece precisely and automatically, resulting in a stable and high quality of cutting.

Although, in the described embodiment, the machining table 10 is moved with respect to the laser beam, it may be possible in some applications to move the laser beam 3. In the latter case, the velocity detector 12 will detect the velocity of the laser beam 3. Further, although the optimum laser output is shown as a straight line, it may be expressed by a curved line.

In the above-described embodiment, the output of the laser oscillator 2 is switched between continuous and pulsed waveforms. It should be noted, however, that either of these waveforms may be used without switching therebetween according to the cutting conditions, including the type of material and the thickness and relative velocity of the workpiece, with the same effect.

As discussed herein, machining is described with reference to the cutting of a workpiece. However, the present invention can also be applied to other laser machining operations such as laser welding in which a uniform melt depth is required and a laser heat treatment in which a uniform tempering depth is required.

As described above, the laser machining apparatus of the present invention includes the velocity detector for detecting the velocity of the laser beam relative to the workpiece, the optimum laser output storage device for storing the optimum laser output with respect to the relative velocity and corresponding to the material and thickness of the workpiece, the optimum laser output determining device for determining the optimum laser output according to the detection output signal of the velocity detector and on the basis of the memory output from the optimum laser output storage device, and the laser output control device for controlling the output of the laser oscillator on the basis of the output of the optimum laser output determining device. With this apparatus, it is possible to cut stably and automatically a plate-type workpiece having a complex configuration within a short period, while attaining high precision and high quality with minimized burn-through loss due to thermal saturation.

We claim:

1. A laser machining apparatus comprising: a laser oscillator for irradiating a workpiece with laser light, drive means for effecting transverse movement of said laser light relative to said workpiece, a speed detector for determining a relative speed of transverse movement between said laser light and said workpiece from movement of said drive means, optimum laser operating parameter storage means for storing values of laser operating parameters optimum with respect to the speed of transverse movement of said laser light relative to said workpiece and with respect to a material type and thickness of said workpiece, optimum laser operating parameter determining means for determining optimum laser operating parameters in accordance with said relative speed detected by said speed detector and on the basis of a content of said optimum laser operating parameter storage means, and laser operating parameter control means for controlling operating parameters of said laser oscillator according to an output of said optimum laser operating parameter determining means.

2. The apparatus as claimed in claim 1, wherein said drive means comprises: a machining table for supporting said workpiece, and a driving source for moving said machining table in X and Y directions.

3. The apparatus as claimed in claim 2, wherein said driving source comprises: an X-axis drive motor and a Y-axis drive motor, and wherein said speed detector detects said relative speed on the basis of rates of rotation of said drive motors.

4. The apparatus as claimed in claim 1, wherein said values of said optimum laser operating parameters stored in said optimum laser operating parameter storage means include values indicative of laser light intensity and both continuous and pulsed waveforms, and said optimum laser operating parameter determining means selects from said values stored in said storage means an optimum laser light intensity and an optimum one of continuous and pulsed waveforms in accordance with the relative speed determined by said speed detector and the material type and thickness of the workpiece, so that said laser light will have a waveform and intensity optimal for the relative speed determined by said speed detector and the material type and thickness of said workpiece.

5. The apparatus as claimed in claim 1, wherein said values of said optimum laser operating parameters stored in said optimum laser operating parameter determining means indicate a continuous waveform when said speed detected by said speed detector is larger than a predetermined value and indicate a pulsed waveform when said speed detected by said speed detector is less than said predetermined value, said predetermined value being dependent upon a material type and thickness of said workpiece.

6. The apparatus as claimed in claim 1, wherein said optimum laser operating parameter storage means and said optimum laser operating parameter determining means are constituted by a single microcomputer.

7. The apparatus as claimed in claim 1, wherein the speed of transverse movement of said laser light relative to said workpiece is manually controlled.

8. The apparatus as claimed in claim 1, wherein said optimum laser operating parameters include laser light intensity.

* * * * *